US011402470B2

(12) United States Patent
Rakshit et al.

(10) Patent No.: US 11,402,470 B2
(45) Date of Patent: Aug. 2, 2022

(54) METHOD AND SYSTEM FOR MONITORING MACHINE HEALTH USING RADAR BASED SEGREGATION FOR INDUCED MACHINE VIBRATIONS

(71) Applicant: Tata Consultancy Services Limited, Mumbai (IN)

(72) Inventors: Raj Kumar Rakshit, Kolkata (IN); Ranjan Dasgupta, Kolkata (IN); Tapas Chakravarty, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 380 days.

(21) Appl. No.: 16/702,430

(22) Filed: Dec. 3, 2019

(65) Prior Publication Data

US 2020/0182967 A1 Jun. 11, 2020

(30) Foreign Application Priority Data

Dec. 5, 2018 (IN) .............................. 201821045986

(51) Int. Cl.
*G01S 7/41* (2006.01)
*G01M 99/00* (2011.01)

(52) U.S. Cl.
CPC ........... *G01S 7/415* (2013.01); *G01M 99/005* (2013.01)

(58) Field of Classification Search
CPC .......... G01S 7/415; G01S 13/88; G01S 7/354; G01S 7/414; G01S 13/52; G01M 99/005;
(Continued)

(56) References Cited

U.S. PATENT DOCUMENTS 9,709,671 B1 * 7/2017 Slater ....................... G01H 9/00
10,399,393 B1 * 9/2019 Trotta ................. B60C 23/0452
(Continued)

FOREIGN PATENT DOCUMENTS

CN          106644030 A  *  5/2017  ............... G01H 9/00
WO  WO-2016089238 A1 *  6/2016  ............. G01H 1/003

OTHER PUBLICATIONS

Stanković, L. et al. (Sep. 2013). "Compressive Sensing Based Separation of Nonstationary and Stationary Signals Overlapping in Time-Frequency," *IEEE Transactions on Signal Processing*, vol. 61, No. 18; pp. 4562-472.

(Continued)

*Primary Examiner* — Timothy A Brainard
*Assistant Examiner* — Juliana Cross
(74) *Attorney, Agent, or Firm* — Finnegan, Henderson, Farabow, Garrett & Dunner LLP

(57) ABSTRACT

Monitoring vibrations induced on non-rotational components, of a machine is a key requirement to ensure that the machine is well within safe operational limits. Existing approaches are sensor based and may not be practical in many practical scenarios with extreme environments. Embodiments herein provide method and system for monitoring machine health using radar based segregation for induced machine vibrations. The method provides model free a data driven approach wherein a micro Doppler signal captured by the RADAR placed in proximity of a target machine is processed and analyzed in accordance with a Wide Band Frequency Spectrum (WBFS) to estimate a rotational frequency and a translational frequency of induced machine vibrations in the target machine. Further, apply a rule engine on the estimated rotational frequency and the translational frequency to provide an alert notifica- (Continued)

tion to an end user when the induced machine vibrations cross the defined machine standards.

9 Claims, 6 Drawing Sheets

(58) Field of Classification Search
CPC ........ G01M 13/045; G01M 1/16; G01M 7/02; G01M 13/028; G01M 13/00; G01H 9/00; A61B 5/0816; A61B 5/113
See application file for complete search history.

(56) References Cited

U.S. PATENT DOCUMENTS

| | | | | |
|---|---|---|---|---|
| 2019/0302252 | A1* | 10/2019 | Santra | G01S 13/904 |
| 2019/0317191 | A1* | 10/2019 | Santra | G01S 13/881 |
| 2020/0081117 | A1* | 3/2020 | Flores Tapia | G01S 7/415 |
| 2020/0160046 | A1* | 5/2020 | Andreou | G06K 9/6296 |
| 2020/0182967 | A1* | 6/2020 | Rakshit | G01S 7/415 |
| 2020/0310549 | A1* | 10/2020 | Rani | G06N 20/00 |
| 2021/0199761 | A1* | 7/2021 | Chowdhury | G06K 9/0055 |
| 2021/0365778 | A1* | 11/2021 | Dey | G06V 10/82 |

OTHER PUBLICATIONS

Colegrove, S.B. et al. (Oct. 2006). "Separation of Target Rigid Body and Micro-Doppler Effects in ISAR Imaging," *IEEE Transactions on Aerospace and Electronic Systems*, vol. 42, No. 4; pp. 1496-1506.

Stanković, L. et al. (Oct. 2006). "Time-Frequency Representation Based Approach for Separation of Target Rigid Body and Micro-Doppler Effects in ISAR Imaging," retrieved from https://www.researchgate.net/publication/3007053_Separation_of_target_rigid_body_and_micro-Doppler_effects_in_ISAR_imaging (15 pages).

* cited by examiner

METHOD AND SYSTEM FOR MONITORING MACHINE HEALTH USING RADAR BASED SEGREGATION FOR INDUCED MACHINE VIBRATIONS

PRIORITY CLAIM

The present application claims priority from Indian patent application no. 201821045986, filed on Dec. 5, 2018. The entire contents of the aforementioned application are incorporated herein by reference.

TECHNICAL FIELD

The disclosure herein generally relates to machine health monitoring, and, more particularly, to method and system for monitoring machine health using RADAR based segregation for induced machine vibrations.

BACKGROUND

Advent of 'big data' and rapidly advancing machine learning methods has enabled implement machine prognostics, where the operating conditions of machines are being evaluated in near real-time. Typically for rotational machines with multiple moving rotational components, monitoring of induced machine vibrations in rigid components of the machine is critical. Machines can experience anomalies due to situations such as mass imbalance, mechanical wear and tear, loose contacts, misalignments and the like. Such incidents lead to vibrations induced on non-rotating components, noisy environments, increased harmonic distortions in power supply, thermal expansion and so on. This may lead to disastrous breakdown of the machines. Thus measurement and monitoring of machine vibrations in rigid components of the machine induced due to major moving components of the machine needs to be analyzed, quantified to predict the health condition of the machine in near real-time. Conventional methods for monitoring health condition of a machine rely on large numbers of (niche) sensors required to be placed in-situ. For example, accelerometers are placed on axle to measure induced vibrations and the like. Often it is observed that heavy-duty machines operate in extreme conditions like high temperatures, fumes, which make it difficult to propose in-situ sensors. Thus, sensor based approaches are not practical in many scenarios.

RAdio Detection And Ranging (RADAR) based solutions are being widely used for the non-sensor based approaches in multiple application domains specifically ISAR imaging. Some existing method utilize micro Doppler (mD) effects of a RADAR signal for ISAR imaging of moving targets with rigid and non-rigid components. These existing methods specifically focus on RADAR based monitoring of moving targets positioned at long distances and for ISAR imaging. ISAR imaging requires costly RADAR configuration such as Pulsed and FMCW making RADAR based analysis high cost solution. Moreover, the mD signal analysis performed by the existing methods is based on rigorous mathematical approaches, hence require computationally intensive system for processing, adding to the cost and difficulty of implementation.

SUMMARY

Embodiments of the present disclosure present technological improvements as solutions to one or more of the above-mentioned technical problems recognized by the inventors in conventional systems. For example, in one aspect, there is provided a hardware processor implemented method for monitoring machine health using a RAdio Detection And Ranging (RADAR) based segregation for induced machine vibrations. The method comprises: receiving from a RADAR, by one or more hardware processors, a micro-Doppler (mD) signal corresponding to a predefined window length of observation, wherein source of the mD signal captured by the RADAR is a target machine comprising a plurality of rotational components and a plurality of rigid components; preprocessing the received mD signal; obtaining a power spectrum of the preprocessed mD signal to determine a plurality of peak frequencies in the power spectrum with varying power levels, wherein a maximum peak frequency among the plurality of peak frequencies corresponding to a maximum power level represents a rotational frequency ($f_{rotational}$) associated with the plurality of rotational components of the target machine; determining a set of peak frequencies from the plurality of peak frequencies, wherein power level of the set of peak frequencies is below the maximum power level; varying a modulation index ($\beta$), for each peak frequency among the set of peak frequencies from a minimum modulation index ($\beta$min) to a maximum modulation index ($\beta$max) at regular predefined intervals; constructing a plurality of signals for each value of $\beta$ varying from $\beta$ min to $\beta$ max for each peak frequency; determining cross correlation between each constructed signal among the constructed plurality of signals and the preprocessed mD signal; identifying a constructed signal among the plurality of constructed signals that provides maximum value of cross correlation when each constructed signal is compared with the preprocessed mD signal; and estimating a frequency corresponding to the identified constructed signal as a translational frequency ($f_{translational}$), wherein the translational frequency ($f_{translational}$) corresponds to translational machine vibrations induced by the plurality of rotational components into the plurality of rigid components of the target machine. Furthermore the method comprises determining status of a first flag associated with the estimated rotational frequency ($f_{rotational}$) and a second flag associated with the estimated translational frequency ($f_{translational}$), wherein an alert notification is provided to an operator based on the status of the first flag and the second flag.

In another aspect, there is provided a system for monitoring machine health using a RAdio Detection And Ranging (RADAR) based segregation for induced machine vibrations, the system comprising: a memory storing instructions; one or more Input/Output (I/O) interfaces; and one or more hardware processors coupled to the memory via the one or more I/O interfaces, wherein the one or more hardware processors are configured by the instructions to: receive from a RADAR, by one or more hardware processors, a micro-Doppler (mD) signal corresponding to a predefined window length of observation, wherein source of the mD signal captured by the RADAR is a target machine comprising a plurality of rotational components and a plurality of rigid components; preprocessing the received mD signal; obtain a power spectrum of the preprocessed mD signal to determine a plurality of peak frequencies in the power spectrum with varying power levels, wherein a maximum peak frequency among the plurality of peak frequencies corresponding to a maximum power level represents a rotational frequency ($f_{rotational}$) associated with the plurality of rotational components of the target machine; determining a set of peak frequencies from the plurality of peak frequencies, wherein power level of the set of peak frequencies is below the maximum power level; vary a modulation index (β), for each peak frequency among the set of peak frequencies from β min to β max at regular predefined intervals; construct a plurality of signals for each value of varying from a minimum modulation index (β min) to a maximum modulation index (β max) for each peak frequency; determine cross correlation between each constructed signal among the constructed plurality of signals and the preprocessed mD signal; identify a constructed signal among the plurality of constructed signals that provides maximum value of cross correlation when each constructed signal is compared with the preprocessed mD signal; and estimate frequency corresponding to the identified constructed signal as a translational frequency ($f_{translational}$), wherein the translational frequency ($f_{translational}$) corresponds to translational machine vibrations induced by the plurality of rotational components into the plurality of rigid components of the target machine. Furthermore the system comprises determining status of a first flag associated with the estimated rotational frequency ($f_{rotational}$) and a second flag associated with the estimated translational frequency ($f_{translational}$), wherein an alert notification is provided to an operator based on the status of the first flag and the second flag.

In yet another aspect, there are provided one or more non-transitory machine readable information storage mediums comprising one or more instructions which when executed by one or more hardware processors causes a method for monitoring machine health using a RAdio Detection And Ranging (RADAR) based segregation for induced machine vibrations, the method comprising: receiving from a RADAR, by one or more hardware processors, a micro-Doppler (mD) signal corresponding to a predefined window length of observation, wherein source of the mD signal captured by the RADAR is a target machine comprising a plurality of rotational components and a plurality of rigid components; preprocessing the received mD signal; obtaining a power spectrum of the preprocessed mD signal to determine a plurality of peak frequencies in the power spectrum with varying power levels, wherein a maximum peak frequency among the plurality of peak frequencies corresponding to a maximum power level represents a rotational frequency ($f_{rotational}$) associated with the plurality of rotational components of the target machine; determining a set of peak frequencies from the plurality of peak frequencies, wherein power level of the set of peak frequencies is below the maximum power level; varying a modulation index (β), for each peak frequency among the set of peak frequencies from a minimum modulation index (β min)) to a maximum modulation index (β max) at regular predefined intervals; constructing a plurality of signals for each value of varying from β min to β max for each peak frequency; determining cross correlation between each constructed signal among the constructed plurality of signals and the preprocessed mD signal; identifying a constructed signal among the plurality of constructed signals that provides maximum value of cross correlation when each constructed signal is compared with the preprocessed mD signal; and estimating a frequency corresponding to the identified constructed signal as a translational frequency ($f_{translational}$), wherein the translational frequency ($f_{translational}$) corresponds to translational machine vibrations induced by the plurality of rotational components into the plurality of rigid components of the target machine. Furthermore the method comprises determining status of a first flag associated with the estimated rotational frequency ($f_{rotational}$) and a second flag associated with the estimated translational frequency ($f_{translational}$), wherein an alert notification is provided to an operator based on the status of the first flag and the second flag.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a component of this disclosure, illustrate exemplary embodiments and, together with the description, serve to explain the disclosed principles.

DETAILED DESCRIPTION OF EMBODIMENTS

Figure 1:
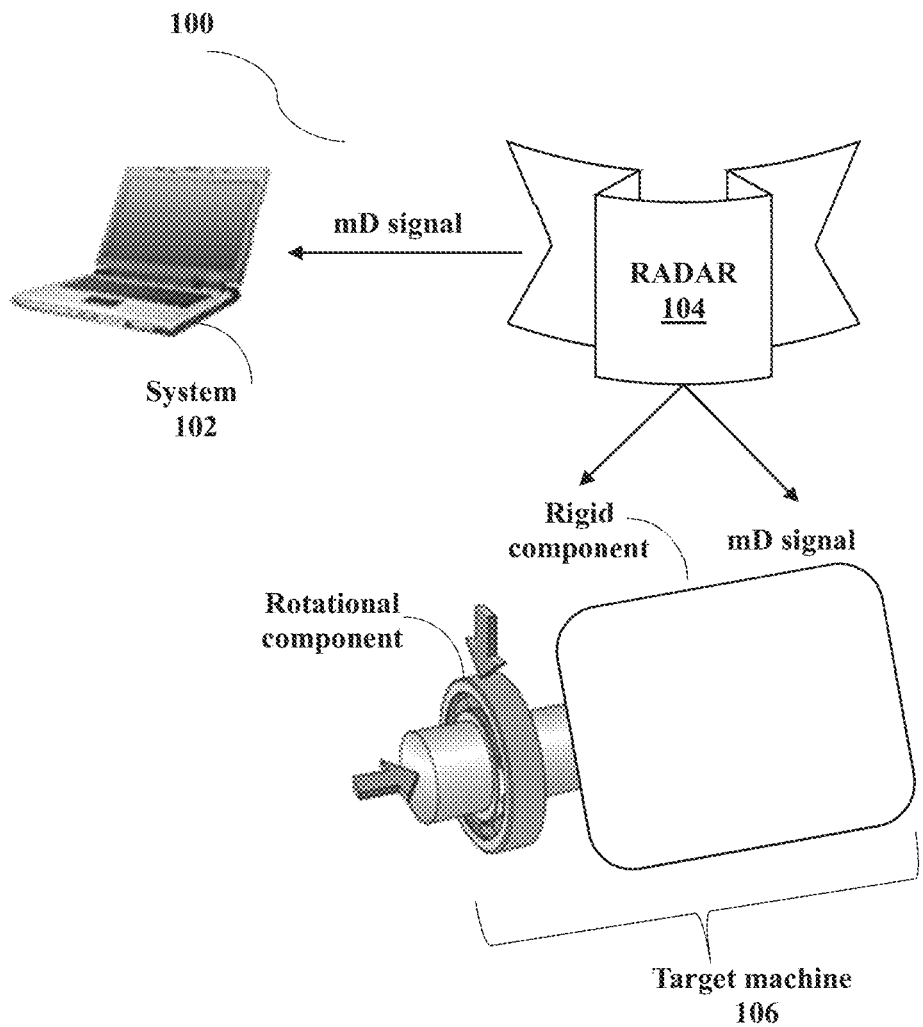
FIG. 1 illustrates an exemplary RAdio Detection And Ranging (RADAR) environment with a system for monitoring machine health using the RADAR based segregation for induced machine vibrations of a target machine, in accordance with an embodiment of present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Monitoring vibrations induced on non-rotating components, of a machine is a key requirement to ensure that the machine is well within safe operational limits. Such limits for different machine classes are defined in ISO 10816 standards. The machine, interchangeably referred as a target machine, can experience anomalies due to situations such as mass imbalance, mechanical wear and tear, loose contacts, misalignments and the like. Such incidents lead to vibrations induced on the non-rotating components (rigid components) of the machine due to the rotating components (rotational components), which create undesired noisy environments, increased harmonic distortions in power supply, thermal expansion and so on. In order to prevent disastrous breakdown of the machines, it is paramount to measure and quantify the induced vibrations on rigid components of interest of the machine in near real-time. Unlike sensor based, difficult to implement solutions, required is a non-contact sensing mechanism for continuous monitoring of vibrations induced on different machine components and a mechanism for segregating the vibrations induced on critical non-rotating or rigid components from those seen with respect to the rotating components or components. Further, an analysis of the segregated induced machine vibrations needs to be performed to indicate current health of the machine in near real time for prevention machine breakdown and reduce downtime of a task to be completed by the machine.

Embodiments of the present disclosure provide a method and system for monitoring machine health using RAdio Detection And Ranging (RADAR) based segregation for induced machine vibrations. The method provides model free a data driven approach, wherein spectrum analysis of received signal is performed to derive insights of machine health of machine of interest. The data driven approaches are easy to implement, as these systems do not rely on the physical modelling of one particular machine. The system disclosed can be used for different machines and varying applications, enhancing the usability.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 illustrates an exemplary RADAR environment 100 comprising a system 102 for monitoring machine health using the RADAR based segregation for induced machine vibrations of a target machine 106, in accordance with an embodiment of present disclosure. The RADAR environment 100, utilizes a RADAR 104 placed at proximity to a target machine 104, whose health is to be monitored in terms of induced machine vibrations in the rigid components of the target machine 106 due to one or more rotational components of the target machine 106.

In an example embodiment, a Doppler RADAR module which consists of standard (low cost commercially available) Continuous Wave (CW) RADAR front-end such as HB100™ from AgilSense™, microcontroller board provides a sensing mechanism that triggers a RADAR front-end and acquires mD signal reflected from the target machine 104. The system 102 is configured to process and analyze the received mD signal and notify (e.g., via one or more communication medium(s)) health of the target machine 106 to an end user, for example a machine operator.

Figure 2:
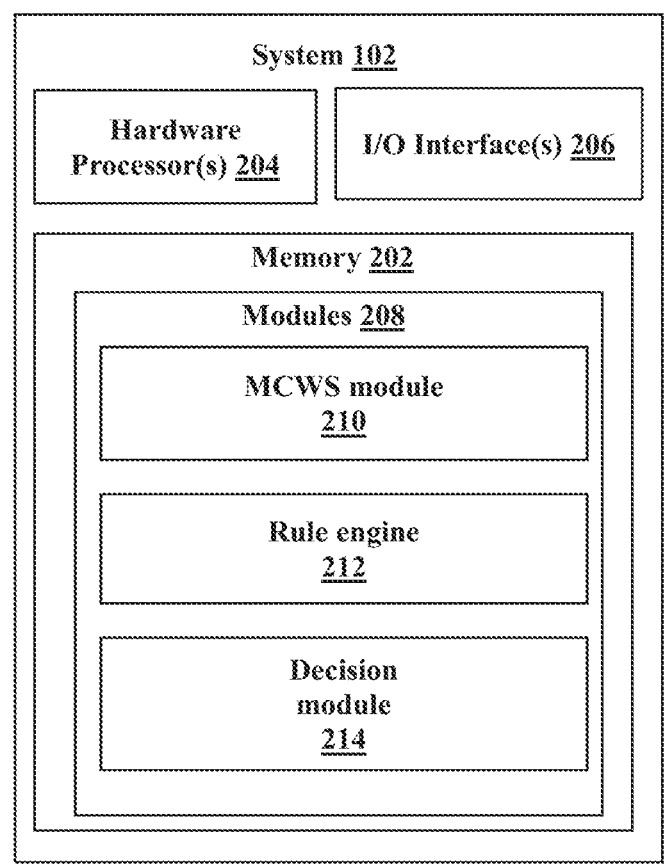
FIG. 2 illustrates an exemplary block diagram of the system of FIG. 1 for monitoring machine health using RADAR based segregation for induced machine vibrations, in accordance with an embodiment of the present disclosure.

The system 102 is configured to process and analyze the signal in accordance with a Motion Compensation by Wireless Signature (MCWS) module and a decision module, further explained in conjunction with FIG. 2 and FIG. 3. Thus, the system 102 is configured to segregate vibrations induced on critical non-rotational components due to the rotational components utilizing only the Doppler phenomenon of a RADAR 104 and provide an alert or notification to the end user, in case vibrations measured cross a pre-defined threshold, which may be based on defined machine standards.

The RADAR 104, is placed in proximity of the target machine 106 but on a separate platform away from the target machine 104, thus effectively away from any hazardous and extreme environment of the target machine 104 and still in capacity to transmit the RADAR signal and accurately pick up the mD signal from the target machine 106. The mD signal, as defined in the art is a reflected RADAR signal with a frequency spectrum comprising a peak frequency corresponding to the major vibration frequency of any target (herein the rotational frequency ($f_{rotational}$) rotational) of the target machine 106 and side bands corresponding to frequency modulation of the peak frequency ($f_{rotational}$) in accordance with minor vibrations in the target (herein lateral induced machine vibrations with frequency ($f_{translational}$) in the rigid components of the target machine 106. Thus the information of the rotational vibrations and lateral induced machine vibrations carried by the mD signal is picked up by the RADAR at-least 3-5 m away from the target machine 106 and further processed by the system 102.

The target machine 106 can be any stationary machine comprising a rigid body and moving components, for example, a motor with rotating shaft and rigid body firmly placed on a platform, motor pump and the like.

FIG. 2 illustrates an exemplary block diagram of the system 102 for monitoring machine health using the RADAR based segregation for induced machine vibrations of the target machine 106, in accordance with an embodiment of the present disclosure.

In an embodiment, the system 102 includes one or more processors 104, communication interface device(s) or input/output (I/O) interface(s) 206, and one or more data storage devices or memory 202 operatively coupled to the one or more processors 204. The one or more processors 204 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 102 can be implemented in a variety of computing systems, such as laptop computers, notebooks, hand-held devices, workstations, mainframe computers, servers, a network cloud and the like.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server. The I/O interface 206 receives the mD signal, wherein source of the mD signal captured by the RADAR is the target machine 106 comprising the rotational components and the rigid components.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a plurality of modules 208 can be stored in the memory 102, wherein the modules 208 may comprise a MCWS module 210, a rule engine 212 and a decision module 214, which are configured to monitor machine health using the RADAR based segregation for induced machine vibrations of the target machine 106, when executed by the one or more processors 204. The memory 202 may further comprise information pertaining to input(s)/output(s) of each step performed by the MCWS module 210, the rule engine 212 and the decision module 214 of the system 102 and methods of the present disclosure. The system 102, through the I/O interface 206 may be coupled to external plurality of data sources 216, providing data required by the system 102.

Figure 3A:
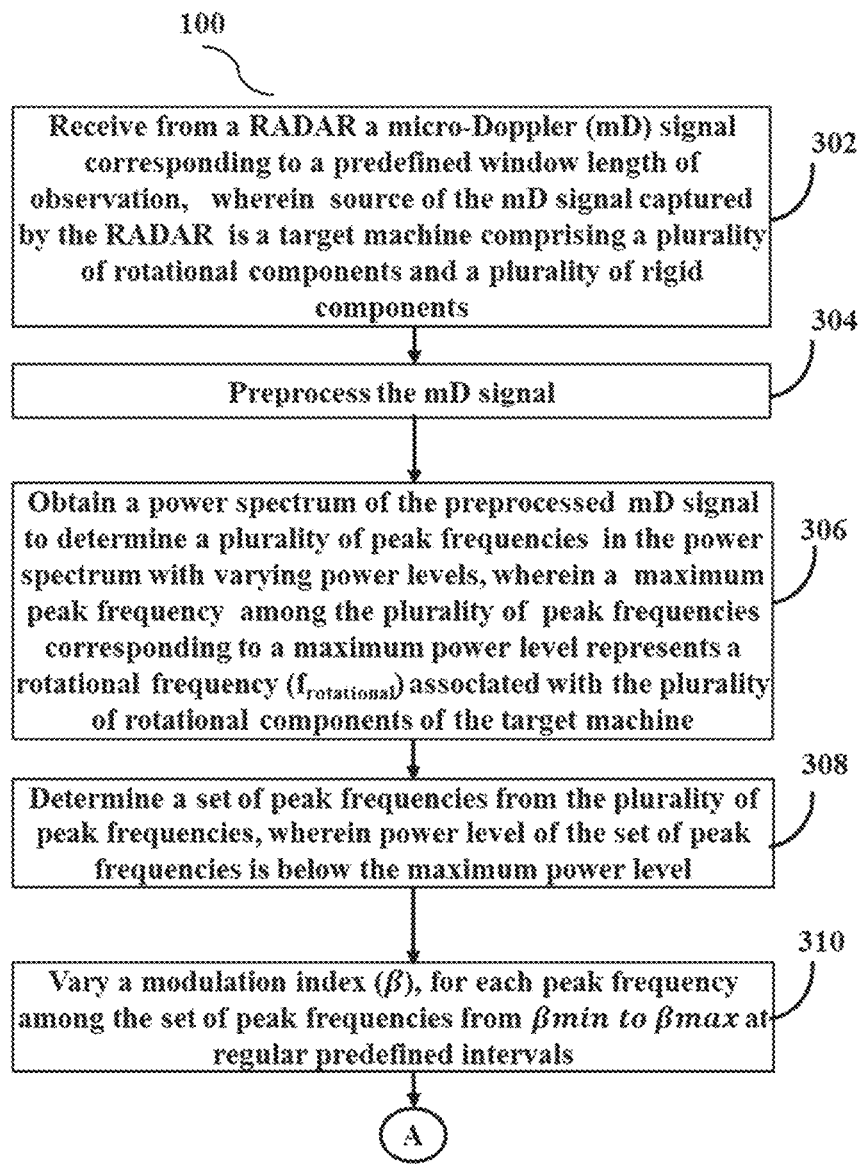
FIG. 3A and FIG. 3B illustrate an exemplary flow diagram of a method, implemented by the system of FIG. 1 and FIG. 2, for monitoring machine health using the RADAR based segregation for induced machine vibrations, in accordance with an embodiment of the present disclosure.
Figure 3B:
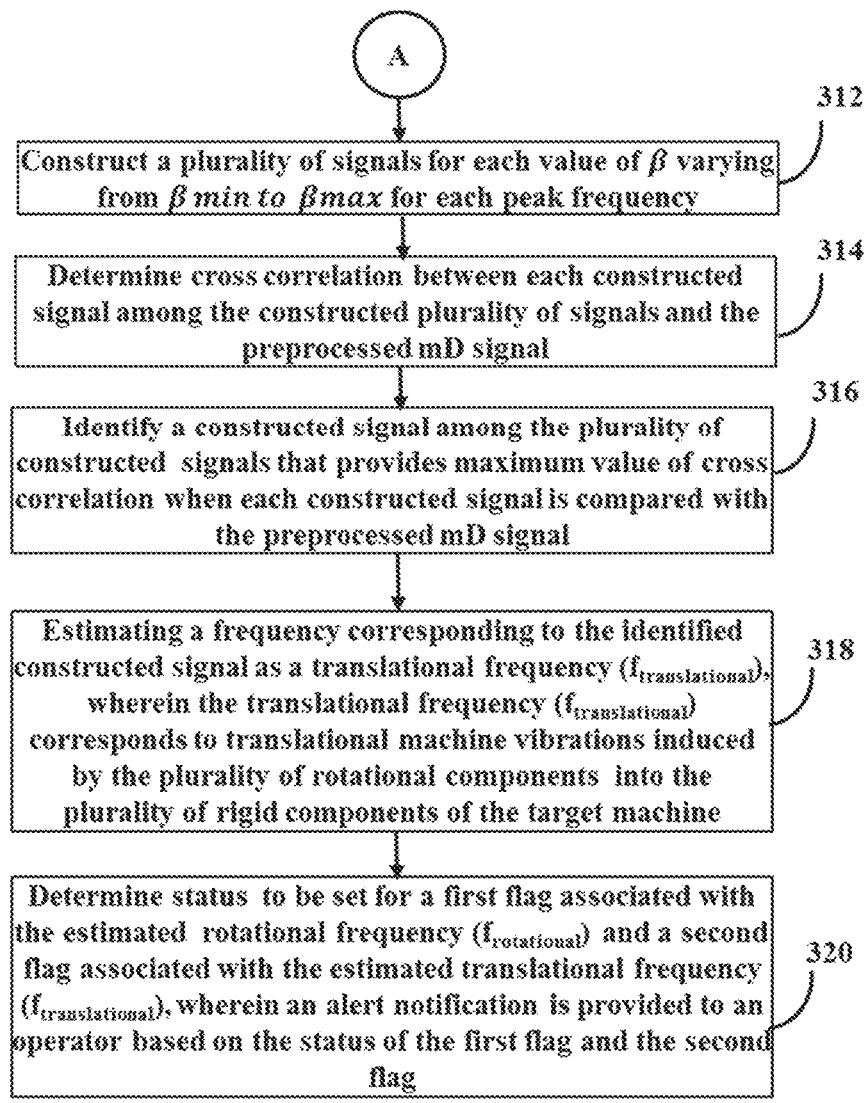

FIG. 3A and FIG. 3B illustrate an exemplary flow diagram of a method 300, implemented by the system 102 of FIG. 1 and FIG. 2 to monitor machine health using the RADAR based segregation for induced machine vibrations of the target machine 106, in accordance with an embodiment of the present disclosure. In an embodiment, the system 102 comprises one or more data storage devices or the memory 202 operatively coupled to the one or more hardware processors 204 and is configured to store instructions for execution of steps of the method 300 by the one or more processors 204 in conjunction with various modules of the modules 208. The steps of the method 300 of the present disclosure will now be explained with reference to the components of the system 102 as depicted in FIG. 1 and FIG. 2 and the steps of flow diagram as depicted in FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

At step 302 of the method 300, the MCWS module 210 is configured to receive, from the RADAR 104, the mD signal corresponding to a predefined window length of observation. The source of the mD signal is the target machine 106 comprising the plurality of rotational components and the plurality of rigid components. The choice of window length for the mD signal is dependent on the required precision of a given application. For example, if a frequency resolution of 1 Hertz is to be attained, the window length should be 10 seconds (also referred as 'sec'). Further, one consideration for selecting the window length is that machines which are rigidly mounted or machines with primal stationary components do not typically show high drift in frequency over a short period of time. Hence, an example preferred window length for a typical experimental observation that provides an optimal window length is set to 10 sec. Further, at step 304 of the method 300, the MCWS module 210 is also configured to preprocess the received mD signal. The preprocessing of the mD signal comprises filtering the received mD signal using a band pass filter comprising a High Pass Filter (HPF) followed by a Low Pass Filter (LPF). The band pass filter filters out noise, if any, present in the received mD signal. Further the band pass filter, with frequency cut offs of the HPF and the LPF is selected as desired. The band pass filtering enables to focus only on the frequency band (spectrum) of interest to be analyzed. Thus providing flexibility to set the band, based on the frequencies associated with the target machine 106. Moreover, if likelihood of the presence of the rotational frequency is known apriori, this filtering helps immensely to quickly focus of the band of interest.

Further, the filtered mD signal may be processed by performing at least one of an interpolation process or a double derivative process. The interpolation oversamples the filtered mD signal and effectively improves the resolution of the received mD signal. The double derivative increases abrupt transitions in the filtered mD signal of the interpolated mD signal and enhances the peaks identified.

Optionally the filtered mD signal may be processed by performing coherent sampling to eliminate spectrum leakage.

Once the preprocessed the mD signal is obtained, at step 306 of the method 300, the MCWS module 210 is configured to obtain a power spectrum or frequency spectrum of the preprocessed mD signal to determine a plurality of peak frequencies with varying power levels. A maximum peak frequency among the plurality of peak frequencies that corresponds to a maximum power level represents the rotational frequency ($f_{rotational}$) associated with the plurality of rotational components of the target machine 104. This is identified by identifying maximas in the preprocessed mD signal. Thus, the first frequency which has maximum power (global maxima) is identified. Further, detected are a set of frequencies (other peak frequency components) whose power level are no less than 2 dBm with respect to the global maxima peak. At step 308 of the method 300, the MCWS module 210 is configured to determine the set of peak frequencies from the plurality of peak frequencies for which power level is below the maximum power level.

Upon identifying the maximum peak frequency and the set of peak frequencies, at step 310 of the method 300, the MCWS module 210 is configured to vary a modulation index (β), for each second peak frequency from a minimum modulation index (β min) to a maximum modulation index (β max) at regular predefined intervals. The maximum peak frequency is the frequency with maximum power in the power spectrum plot. Side bands (set of frequencies) are frequency components adjacent to the peak frequency. Thus, the set of peak frequencies, also alternatively defined by term $w_m$ or message frequency, is varied from 1 to 50 Hertz as it incorporates $f_{translational}$ speed from 0.01 to 0.7 m/s (roughly). This seems to be a good estimate for machines with rigid/stationary mounts.

The values of β are varied from 0 to 2. In WBFM, β is always greater than 1. However there is no upper-limit on (β). Thus, the method, during experimentation, utilizes variation of β up to 2, as it suffices the requirement.

At step 312 of the method 300, the MCWS module 210 is configured to construct a plurality of signals for each value of β varying from β min to β max for each peak frequency from the set of peak frequencies. Once the plurality of signals are constructed, at step 314 of the method 300, the MCWS module 210 is configured to determine cross correlation between each constructed signal among the constructed plurality of signals and the preprocessed mD signal. At step 316 of the method 300, the MCWS module 210 is configured to identify a constructed signal among the plurality of constructed signals that provides maximum value of cross correlation when each constructed signal is compared with the received mD signal. At step 318 of the method 300, the MCWS module 210 is configured to estimate a frequency corresponding to the identified constructed signal, which provides providing maximum value of the cross correlation, as the translational frequency ($f_{translational}$). The $f_{translational}$ corresponds to translational machine vibrations induced by the plurality of rotational components into the plurality of rigid components of the target machine 106.

Once the $f_{translational}$ and $f_{rotational}$ are estimated, then at step 320 of the method 300, the rule engine 212 and the decision module 214 in conjunction are configured to determine status of a first flag (flag 1) associated with the estimated rotational frequency ($f_{rotational}$) and a second flag (flag 2) associated with the estimated translational frequency ($f_{translational}$).

An example rule engine is provided below:

```
If {rotational_freq (f_rotational) <= f_nominal +- 1%} (a first frequency
threshold)
        flag1□ YES (or RESET) ( indicates f_rotational below the first
frequency threshold)
else
        flag1□ NO ( or SET) ( indicates f_rotational above the first frequency
threshold)
If {platforml_freq (f_translational) <= f_linear_1} ( a second frequency thresh-
old)
        flag2 □ YES ( or RESET) (indicates f_translational below the
second frequency threshold)
else
        flag2□ NO ( or SET) (indicates f_translational above the second
frequency threshold)
```

Where, $f_{nominal}$ is dependent on prior knowledge of the rotational movement of the target machine 106. Typically machines with rotating parts come with pre-defined RPM limit. The % tolerance depends on the application. During experimentation herein, for example, "1%" is acceptable tolerance. For example, the RPM of loaded and unloaded water pump may have variations more than 1%. The $f_{linear}$, however has standardized values which marks safe/normal behavior of a machine of interest. For example, class 1 machines with linear motion above 4.5 mm/sec are be treated as CRITCAL which translates to 0.32 Hz for X-Band RADAR. This is as defined in the ISO 10816 standards. Calculations for the reference are provided below in conjunction with table 1.

TABLE 1

| Class | Critical vibration speed (mm/sec) as per ISO 10816 STANDARDS | Observable Doppler frequency in Hz as per used X-Band Radar at 10.6 GHz |
| --- | --- | --- |
| 1 | 4.5 | 0.32 |
| 2 | 7.1 | 0.50 |
| 3 | 11.2 | 0.79 |
| 4 | 18.0 | 1.26 |
| 5 | 28 | 1.96 |

$$f_D = \frac{2vf}{c},$$

where, $f_D$=Doppler shift due to rotational components of the target machine 106 v=velocity of the machine, f=radar transmitted frequency,

Wherein, $$f_{translational} = f - f_D = \frac{2vf}{c}$$

and c=Speed of EM wave propagation

For class 1, v=4.5 mm/sec f=10.6 GHz c=3×10^8 m/sec

Hence, $$f_D = \frac{2vf}{c} = 0.32 \text{ Hz}$$

Further, an alert notification is provided to an operator or end user if the estimated rotational frequency is above the first frequency threshold (first flag set) and the estimated translational frequency ($f_{translational}$) is above the second frequency threshold (second flag set). An example decision table of the decision module 214 is provided below in table 2:

TABLE 2

| flag1 | flag2 | Event |
| --- | --- | --- |
| reset | reset | Pass |
| set | No | Alarm |
| set | set | Alarm |
| set | set | Alarm |

Figure 4:
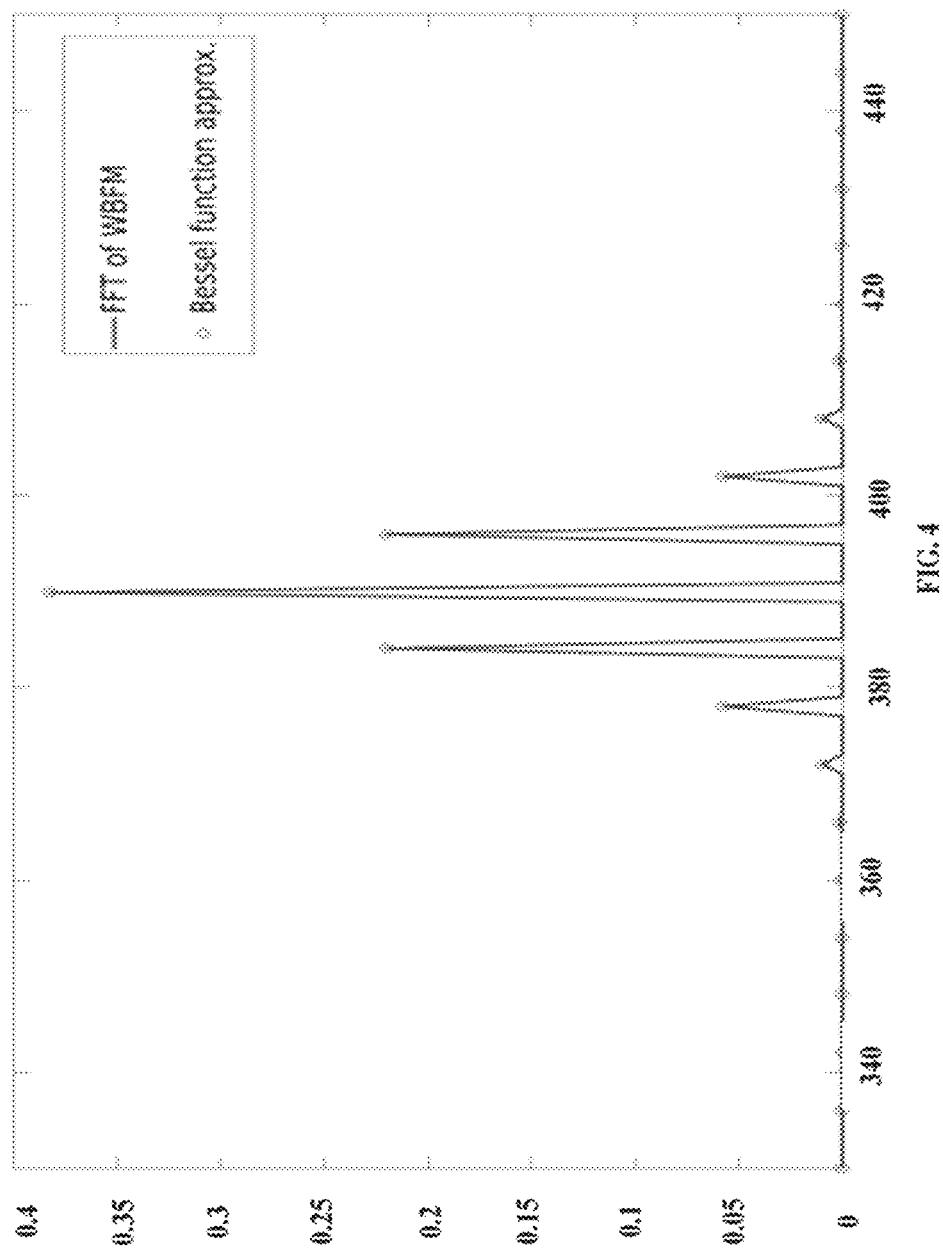
FIG. 4 illustrates a standard Wide Band Frequency Spectrum (WBFM) used as reference spectrum for analyzing a frequency spectrum or power spectrum of a micro-Doppler (mD) signal from a target machine and captured by the RADAR.
Figure 5:
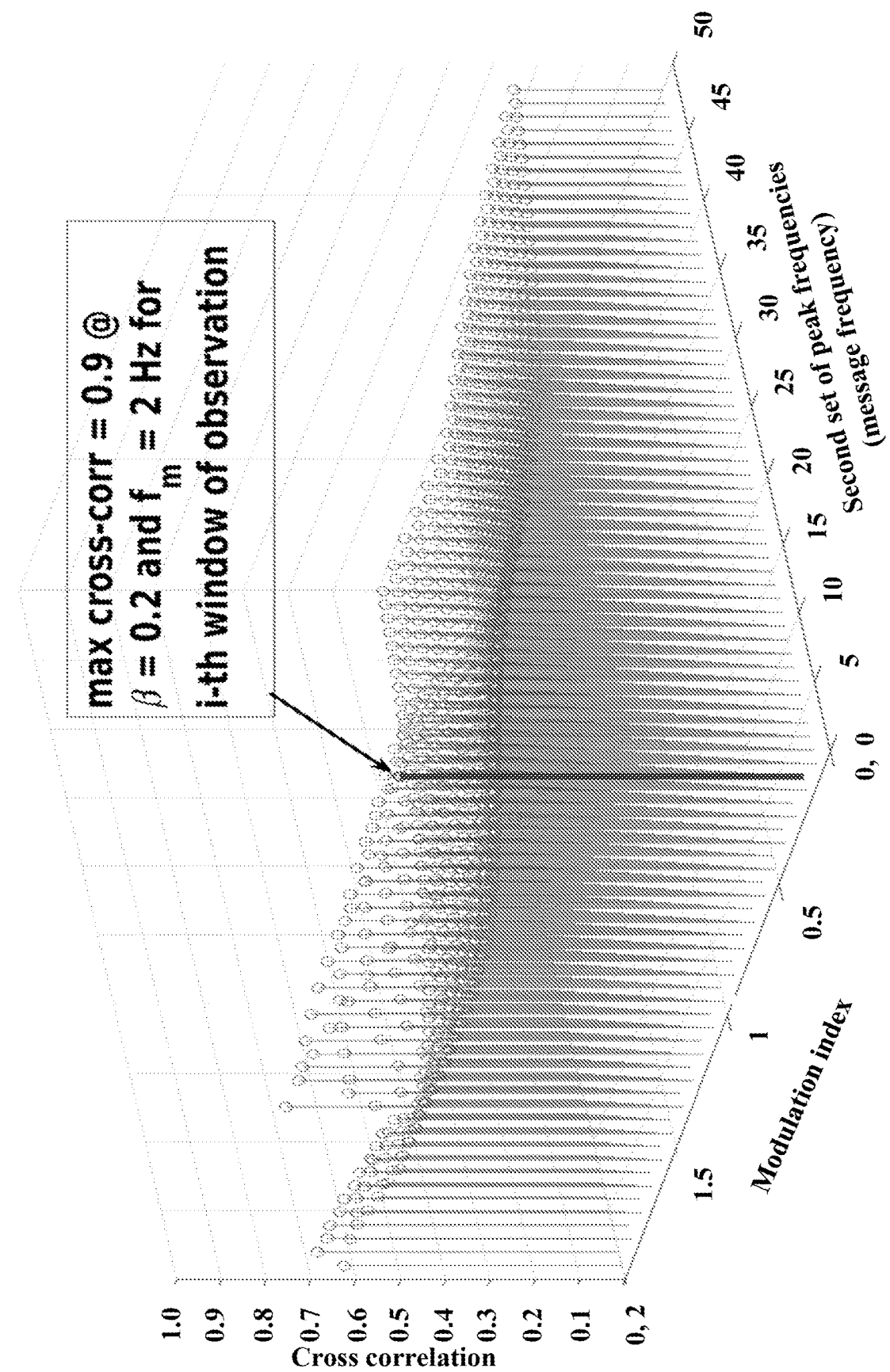
FIG. 5 illustrates experimental results of analysis of the mD signal to determine induced machine vibrations of rotating components of an example machine into rigid components of the machine, in accordance with an embodiment of the present disclosure.

The method 300 is now illustrated with an example through FIGS. 4 and 5. FIG. 4 illustrates a standard Wide Band Frequency Spectrum (WBFM) used as reference spectrum for analyzing a frequency spectrum or power spectrum of the mD signal from the target machine 106 and captured by the RADAR. The WMFM spectrum depicted is the approximation using Bessel functions with fc=390 Hz, $f_m$=6 Hz and β=1. The standard WBFM spectrum is sourced from IEEE transactions tilted Micro-Doppler Effect in Radar: Phenomenon, Model, and Simulation Study "by VICTOR C. CHEN, 2006.

The system 102 and the method 300 treats propeller rotation (rotational motion of rotational components of the target machine) along with a machine platform linear random movement (induced vibrations in rigid components of the target machine 106) jointly as a source of mD effect. The frequencies of the peaks of the power spectrum of the received mD signal will then contain information of a propeller rotation ($f_{rotational}$). Further, the sidebands or the modulation of ($f_{rotational}$) contain information of the linear movement of the platform ($f_{translational}$), which are lateral induced vibrations into the rigid components due to the propeller rotation.

WBFM spectrums are approximated using Bessel functions, which is a function of β (modulation index) and ($f_{translational}$), alternatively referred in the example as message-freq ($f_m$) centered around a carrier frequency ($f_c$). Here, $f_c$ corresponds to propeller vibration ($f_{rotational}$).

The method disclosed identifies a {β, $f_m$} pair to find the linear motion (induced machine vibrations) of the machine platform.

FIG. 5 illustrates experimental results of analysis of the mD signal to determine induced machine vibrations of rotational components of an example machine into rigid components of the machine, in accordance with an embodiment of the present disclosure.

FIG. 5 depicts the analysis of the power spectrum. The steps of the analysis are provided below:
1. Take power spectrum of the received RADAR signal.
2. Identify peak frequencies (~5 dBC) in every window length of observation. (here 1 sec).
3. Jointly optimize to obtain the {β, fm} pair that gives maximum cross-correlation value between traces of the peaks of the received mD signal and the traces of a WBFM signal (constructed signal) generated by the {β, $f_m$} pair, while—

4. Sweeping $f_m$ from 1 to 50 Hz
5. Sweeping β from 0.1 to 3 with step size 0.1
6. Appending zeros adaptively to keep the carrier peaks aligned of the two signals and measuring cross-correlation at zero lag.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for monitoring machine health using RAdio Detection And Ranging (RADAR) based segregation for induced machine vibrations, the method comprising:

receiving from a RADAR, by one or more hardware processors, a micro-Doppler (mD) signal corresponding to a predefined window length of observation, wherein a source of the mD signal captured by the RADAR is a target machine comprising a plurality of rotational components and a plurality of rigid components;

preprocessing the received mD signal;

obtaining a power spectrum of the preprocessed mD signal to determine a plurality of peak frequencies in the power spectrum with varying power levels, wherein a maximum peak frequency among the plurality of peak frequencies corresponding to a maximum power level represents a rotational frequency ($f_{rotational}$) associated with the plurality of rotational components of the target machine;

determining a set of peak frequencies from the plurality of peak frequencies, wherein power level of the set of peak frequencies is below the maximum power level;

varying a modulation index (β), for each peak frequency among the set of peak frequencies from a minimum modulation index (βmin) to a maximum modulation index (βmax) at regular predefined intervals;

constructing a plurality of signals for each value of β varying from the minimum modulation index (βmin) to the maximum modulation index (βmax) for each peak frequency from the set of peak frequencies;

determining cross correlation between each constructed signal among the constructed plurality of signals and the preprocessed mD signal;

identifying a constructed signal among the plurality of constructed signals that provides maximum value of cross correlation when each constructed signal is compared with the preprocessed mD signal; and estimating a frequency corresponding to the identified constructed signal as a translational frequency ($f_{translational}$), wherein the translational frequency ($f_{translational}$) corresponds to translational machine vibrations induced by the plurality of rotational components into the plurality of rigid components of the target machine.

2. The method of claim 1, further comprising determining status of a first flag associated with the rotational frequency ($f_{rotational}$) and a second flag associated with the translational frequency ($f_{translational}$), wherein an alert notification is provided to an operator based on the status of the first flag and the status of the second flag if:

the status of the first flag is set, which indicates that the rotational frequency ($f_{rotational}$) is above a first frequency threshold; or the status of the second flag is set, which indicates that the estimated translational frequency ($f_{translational}$) is above a second frequency threshold.

3. The method of claim 1, wherein the preprocessing of the mD signal comprises:

filtering the received mD signal with a band pass filter to select frequency band of the received mD signal to be analyzed and filter out noise present in the received mD signal; and performing at least one of:
  interpolating the filtered mD signal to derive a higher resolution mD signal; and
  computing double derivative of the interpolated mD signal to increase abrupt transitions in the filtered mD signal.

4. A system for monitoring machine health using RAdio Detection And Ranging (RADAR) based segregation for induced machine vibrations, the system comprising:

a memory storing instructions;
one or more Input/Output (I/O) interfaces;
and one or more hardware processors coupled to the memory (202) via the one or more I/O interfaces, wherein the one or more hardware processors are configured by the instructions to:

receive from a RADAR a micro-Doppler (mD) signal corresponding to a predefined window length of observation, wherein a source of the mD signal captured by the RADAR is a target machine comprising a plurality of rotational components and a plurality of rigid components;

preprocess the received mD signal;

obtain a power spectrum of the preprocessed mD signal to determine a plurality of peak frequencies in the power spectrum with varying power levels, wherein a maximum peak frequency among the plurality of peak frequencies corresponding to a maximum power level represents a rotational frequency ($f_{rotational}$) associated with the plurality of rotational components of the target machine;

determine a set of peak frequencies from the plurality of peak frequencies, wherein power level of the set of peak frequencies is below the maximum power level;

vary a modulation index ($\beta$), for each peak frequency among the set of peak frequencies from a minimum modulation index ($\beta min$) to a maximum modulation index ($\beta max$) at regular predefined intervals;

construct a plurality of signals for each value of $\beta$ varying from the minimum modulation index ($\beta min$) to the maximum modulation index ($\beta max$) for each peak frequency from the set of peak frequencies;

determine cross correlation between each constructed signal among the constructed plurality of signals and the preprocessed mD signal;

identify a constructed signal among the plurality of constructed signals that provides maximum value of cross correlation when each constructed signal is compared with the preprocessed mD signal; and estimate a frequency corresponding to the identified constructed signal as a translational frequency ($f_{translational}$), wherein the translational frequency ($f_{translational}$) corresponds to translational machine vibrations induced by the plurality of rotational components into the plurality of rigid components of the target machine.

5. The system of claim 4, wherein the one or more hardware processors are configured to determine status of a first flag associated with the rotational frequency ($f_{rotational}$) and a second flag associated with the translational frequency ($f_{translational}$), wherein an alert notification is provided to an operator based on the status of the first flag and the status of the second flag if:

the status of the first flag is set, which indicates that the rotational frequency (frotational) is above a first frequency threshold; or the status of the second flag is set, which indicates that the estimated translational frequency (ftranslational) is above a second frequency threshold.

6. The system of claim 4, wherein the one or more hardware processors are configured to preprocess of the mD signal by:

filtering the received mD signal with a band pass filter to select frequency band of the received mD signal to be analyzed and filter out noise present in the received mD signal; and performing at least one of:
  interpolating the filtered mD signal to derive a higher resolution mD signal; and
  computing double derivative of the interpolated mD signal to increase abrupt transitions in the filtered mD signal.

7. One or more non-transitory machine readable information storage mediums comprising one or more instructions which when executed by one or more hardware processors causes a method for:

receiving from a RAdio Detection And Ranging (RADAR) a micro-Doppler (mD) signal corresponding to a predefined window length of observation, wherein a source of the mD signal captured by the RADAR is a target machine comprising a plurality of rotational components and a plurality of rigid components;

preprocessing the received mD signal;

obtaining a power spectrum of the preprocessed mD signal to determine a plurality of peak frequencies in the power spectrum with varying power levels, wherein a maximum peak frequency among the plurality of peak frequencies corresponding to a maximum power level represents a rotational frequency ($f_{rotational}$) associated with the plurality of rotational components of the target machine;

determining a set of peak frequencies from the plurality of peak frequencies, wherein power level of the set of peak frequencies is below the maximum power level;

varying a modulation index ($\beta$), for each peak frequency among the set of peak frequencies from a minimum modulation index ($\beta min$) to a maximum modulation index ($\beta max$) at regular predefined intervals;

constructing a plurality of signals for each value of $\beta$ varying from the minimum modulation index ($\beta min$) to the maximum modulation index ($\beta max$) for each peak frequency from the set of peak frequencies;

determining cross correlation between each constructed signal among the constructed plurality of signals and the preprocessed mD signal;

identifying a constructed signal among the plurality of constructed signals that provides maximum value of cross correlation when each constructed signal is compared with the preprocessed mD signal; and estimating a frequency corresponding to the identified constructed signal as a translational frequency ($f_{translational}$), wherein the translational frequency ($f_{translational}$) corresponds to translational machine vibrations induced by the plurality of rotational components into the plurality of rigid components of the target machine.

8. The one or more non-transitory machine readable information storage mediums of claim 7, further comprising determining status of a first flag associated with the rotational frequency ($f_{rotational}$) and a second flag associated with the translational frequency ($f_{translational}$), wherein an alert notification is provided to an operator based on the status of the first flag and the status of the second flag if:

the status of the first flag is set, which indicates that the rotational frequency ($f_{rotational}$) is above a first frequency threshold; or the status of the second flag is set, which indicates that the estimated translational frequency ($f_{translational}$) is above a second frequency threshold.

9. The one or more non-transitory machine readable information storage mediums of claim 7, wherein the preprocessing of the mD signal comprises:

filtering the received mD signal with a band pass filter to select frequency band of the received mD signal to be analyzed and filter out noise present in the received mD signal; and performing at least one of:
interpolating the filtered mD signal to derive a higher resolution mD signal; and
computing double derivative of the interpolated mD signal to increase abrupt transitions in the filtered mD signal.

\* \* \* \* \*